(12) United States Patent
Parrish et al.

(10) Patent No.: US 7,625,987 B2
(45) Date of Patent: Dec. 1, 2009

(54) GAS PHASE POLYMERIZATION AND METHOD OF CONTROLLING SAME

(75) Inventors: John R. Parrish, Charleston, WV (US); Glenn A. Lambert, Winfield, WV (US); Daniel N. Thomas, Cross Lanes, WV (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 660 days.

(21) Appl. No.: 10/558,941

(22) PCT Filed: May 26, 2004

(86) PCT No.: PCT/US2004/016549

§ 371 (c)(1),
(2), (4) Date: Sep. 27, 2006

(87) PCT Pub. No.: WO2004/111097

PCT Pub. Date: Dec. 23, 2004

(65) Prior Publication Data

US 2007/0043174 A1 Feb. 22, 2007

Related U.S. Application Data

(60) Provisional application No. 60/474,567, filed on May 30, 2003.

(51) Int. Cl.
*C08F 2/34* (2006.01)
*C08F 210/16* (2006.01)
(52) U.S. Cl. ............................. 526/60; 526/59; 526/901
(58) Field of Classification Search ................... 526/59, 526/60, 901
See application file for complete search history.

(56) References Cited

U.S. PATENT DOCUMENTS

| | | | |
|---|---|---|---|
| 3,779,712 A | 12/1973 | Calvert et al. | |
| 4,393,182 A | 7/1983 | Goodall et al. | |
| 4,543,399 A | 9/1985 | Jenkins, III et al. | |
| 4,588,790 A * | 5/1986 | Jenkins et al. ................. | 526/70 |
| 4,621,952 A | 11/1986 | Aronson | |
| 4,877,587 A | 10/1989 | Rhee et al. | |
| 4,933,149 A | 6/1990 | Rhee et al. | |
| 5,106,806 A | 4/1992 | Job | |
| 5,145,819 A | 9/1992 | Winter et al. | |
| 5,317,036 A | 5/1994 | Brady, III et al. | |
| 5,329,033 A | 7/1994 | Spaleck et al. | |
| 5,352,749 A * | 10/1994 | DeChellis et al. ............. | 526/68 |
| 5,405,922 A | 4/1995 | DeChellis et al. | |

(Continued)

FOREIGN PATENT DOCUMENTS

WO   WO96/23010   8/1996

*Primary Examiner*—Fred M Teskin
*Assistant Examiner*—Elizabeth Eng (57) ABSTRACT

A process for controlling a continuous gas phase exothermic process in a reactor comprising: (i) effecting a gas phase exothermic reaction under a set of operating conditions in the presence of a cooling agent, the cooling agent having a preselected concentration and feed rate of an induced cooling agent; (ii) determining a maximum production rate (I) without regard to limitations due to the cooling agent under the operating conditions; (iii) determining a maximum production rate (II) with regard to limitations due to the cooling agent under the operating conditions; (iv) calculating an optimal concentration of the induced cooling agent such that the difference between (I) and (II) is minimized; and (v) adjusting the feed rate of the induced cooling agent to achieve the concentration value calculated in (iv).

30 Claims, 1 Drawing Sheet

U.S. PATENT DOCUMENTS

| | | |
|---|---|---|
| 5,436,304 A | 7/1995 | Griffin et al. |
| 5,453,471 A | 9/1995 | Bernier et al. |
| 5,455,366 A | 10/1995 | Rohrmann et al. |
| 5,462,999 A | 10/1995 | Griffin et al. |
| 5,541,270 A | 7/1996 | Chinh et al. |
| 5,668,228 A | 9/1997 | Chinh et al. |
| 5,693,727 A | 12/1997 | Goode et al. |
| 5,733,510 A | 3/1998 | Chinh et al. |
| 5,804,677 A | 9/1998 | Chinh et al. |
| 5,834,571 A * | 11/1998 | Bernier et al. ............... 526/68 |
| 5,990,250 A | 11/1999 | Parrish et al. |
| 6,001,938 A | 12/1999 | Chinh et al. |
| 6,063,877 A | 5/2000 | Kocian et al. |
| 6,075,101 A | 6/2000 | Lynn et al. |
| 6,096,840 A | 8/2000 | Bernier et al. |
| 6,113,862 A | 9/2000 | Jorgensen et al. |
| 6,117,399 A | 9/2000 | Jorgensen et al. |
| 6,143,843 A | 11/2000 | Bresch |
| 6,187,866 B1 | 2/2001 | Jorgensen et al. |
| 6,218,484 B1 | 4/2001 | Brown et al. |
| 6,255,411 B1 | 7/2001 | Hartley et al. |
| 6,384,156 B1 | 5/2002 | Bernier et al. |
| 6,391,985 B1 | 5/2002 | Goode et al. |
| 6,391,986 B1 | 5/2002 | Goode et al. |
| 6,472,483 B1 | 10/2002 | Goode et al. |
| 6,498,220 B2 | 12/2002 | Hartley et al. |

* cited by examiner

FIGURE 1

GAS PHASE POLYMERIZATION AND METHOD OF CONTROLLING SAME

CROSS REFERENCE TO RELATED APPLICATIONS

This application is a 35 U.S.C. Section 371 of PCT/US2004/016549 filed May 26, 2004, which claims priority to previously filed U.S. Provisional Patent Application Ser. No. 60/474,567 filed May 30, 2003, both of which are incorporated by reference herein in their entirety.

FIELD OF THE INVENTION

The invention relates to a method of controlling and/or optimizing gas phase polymerization.

BACKGROUND OF THE INVENTION

The production of polyolefins in fluidized beds requires that the heat of reaction be removed in order to maintain appropriate temperatures for the desired reaction rate. In addition, the temperature of the vessel cannot be permitted to increase to the point where the product particles become sticky and adhere to each other. The heat of reaction is commonly removed by circulating the gas from the fluidized bed to a heat exchanger outside the reactor and passing the cooled gas back to the reactor.

For example, fluidized bed processes for producing polymer resins are practiced by passing a gaseous stream containing one or more monomers continuously through a fluidized bed reactor under reactive conditions in the presence of a polymerization catalyst. Product is withdrawn from the reactor. A gaseous stream of unreacted monomer is withdrawn from the reactor continuously and recycled into the reactor along with make-up monomer added to the recycle stream.

In condensing mode processes, the recycle stream, or a portion thereof, is cooled to a temperature below the dew point, resulting in condensing all or a portion of the recycle stream. The recycle stream is returned to the reactor. The dew point of the recycle stream can be increased by increasing the operating pressure of the reaction/recycle system and/or increasing the percentage of condensable fluids and decreasing the percentage of non-condensable gases in the recycle stream. Increasing the percentage of condensable fluids can be achieved by introducing an induced cooling agent to the reactor. Greater quantities of heat energy are removed in less time which increases the production capacity of the typical exothermic fluidized bed reactor. Also known in the art is the so-called "induced condensed mode" and "liquid monomer" methods.

Liquid monomer polymerization mode may also be employed, as disclosed in U.S. Pat. No. 5,453,471 which is hereby incorporated by reference. When operating in the liquid monomer mode, liquid can be present throughout the entire polymer bed provided that the liquid monomer present in the bed is adsorbed on or absorbed in solid particulate matter present in the bed, such as polymer being produced or fluidization aids (e.g., carbon black) present in the bed. The liquid monomer process comprises introducing a stream of one or more monomers and optionally one or more inert gases or liquids into the polymerization zone; introducing a polymerization catalyst into the polymerization zone; withdrawing polymer product from the polymerization zone; withdrawing unreacted gases from the zone; and compressing and cooling the gases while maintaining the temperature within the zone below the dew point of at least one monomer present in the zone. If there is only one monomer present in the gas-liquid stream, preferably there also is present at least one inert gas.

The increase in production capacity should be balanced by the amount of induced cooling agent used. The induced cooling agent is a fluid which is inert to the catalyst, reactants and the products of the polymerization reaction. The induced cooling agent is sometimes called an induced condensing agent (ICA). The amount of induced cooling agent should be optimized to lower manufacturing costs, reduce the possibility of reactor fouling, and reduce the environmental impact. There is a need for providing a method for optimizing the amount of induced cooling agent used while maximizing the production capacity of the fluidized bed reactor.

SUMMARY OF THE INVENTION

Embodiments of the invention meet the above need in one or more of the following aspects. In one aspect, the invention relates to a process for controlling a continuous gas phase exothermic process in a reactor comprising: (i) effecting a gas phase exothermic reaction under a set of operating conditions in the presence of a cooling agent, the cooling agent having a pre-selected concentration and feed rate of an induced cooling agent; (ii) determining a maximum production rate (I) without regard to limitations due to the cooling agent under the operating conditions; (iii) determining a maximum production rate (II) with regard to limitations due to the cooling agent under the operating conditions; (iv) calculating an optimal concentration of the induced cooling agent such that the difference between (I) and (II) is minimized; and (v) adjusting the feed rate of the induced cooling agent to achieve the concentration value calculated in (iv).

In another aspect the continuous gas phase exothermic process is an ethylene polymerization process or a propylene polymerization process. The reactor is a fluidized bed reactor and comprises a reactor bed, a reactor outlet and a reactor inlet. The calculation of the optimal concentration of the induced cooling agent comprises: (i) calculating a cycle gas mass enthalpy at the reactor outlet conditions; (ii) calculating a total cycle gas inlet mass enthalpy at the reactor inlet conditions; (iii) calculating a change in the cycle gas mass enthalpy across the reactor bed; (iv) calculating a target cycle gas mass enthalpy change across the bed; and (v) iteratively calculating the concentration of the induced cooling agent that produces a cycle gas mass enthalpy change across the bed substantially equal to the target cycle gas mass enthalpy change across the bed.

DESCRIPTION OF THE INVENTION

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Embodiments of the invention provide a method to optimize the amount of an induced cooling agent used in a polymerization process while maximizing the polymer production rate. The optimization comprises determining the maximum rate of production achievable without regard to production rate limitations due to cooling agent concentration at predetermined operating conditions; determining the maximum rate of production achievable given that cooling agent concentration limits the heat transfer from the reactor at predetermined operating conditions; calculating an induced cooling agent concentration necessary to minimize the difference between the two previous calculations; and adjusting the feed rate of the induced cooling agent to achieve the calculated concentration. The cooling agent can be reactants, inerts, induced cooling agents or combinations thereof. The term "cooling agent" is used for a single cooling agent or a plurality of cooling agents. An inert is a fluid which is inert to the catalyst, reactants and the products of the polymerization reaction. An induced cooling agent is a fluid which is inert to the catalyst, reactants and the products of the polymerization reaction. The induced cooling agent can be manipulated for optimization of the cooling capacity of the reactor system. The term "induced cooling agent" is used for a single induced cooling agent or a plurality of induced cooling agents.

Embodiments of the invention are not limited to any specific type of continuous gas phase exothermic reaction and can be carried out in a stirred or fluidized bed reactor. Two modes of the reaction include condensing and non-condensing mode. The term "condensing" is defined as being condensable, or partially condensable, at the operating conditions of the reaction. Both modes may include cooling agents (further including induced cooling agents) which will change the enthalpy of the cycle gas stream. This may be accomplished by any combination of reactants, inerts, and induced cooling agents condensing or not condensing. Some examples include: the reactants, inerts, and induced cooling agents all condensing; the reactants, inerts, and induced cooling agents all not condensing; the reactants condensing but not the inerts and induced cooling agents; the reactants and inerts condensing and the induced cooling agents not condensing; the reactants and induced cooling agents not condensing but the inerts condensing; the reactants and induced cooling agents condensing but the inerts not condensing; the inerts and induced cooling agents condensing and the reactants not condensing; and the induced cooling agents condensing but not the reactants and inerts. Preferably, the reaction should be conducted using condensing mode, including the so-called "induced condensed mode", or "liquid monomer" methods. Such condensing mode polymerization methods are disclosed in U.S. Pat. Nos. 5,834,571; 5,352,749; and 4,588,790 which are incorporated by reference in their entirety. In a preferred embodiment, the process is a polymerization process. The condensing mode of polymerization employs an induced cooling agent to increase the removal of heat from the process and increase the production rate. In an alternate embodiment, the non-condensing mode of polymerization may employ an induced cooling agent to increase the removal of heat from the process and increase the production rate, however the induced cooling agent would not condense at reactor conditions.

Heat and material balances on the reactor are used to calculate various production parameters. Assuming the heat of reaction $\Delta H_{rxn}$ is at a set of chosen reference conditions, the enthalpy balance is derived in the following manner: i) feed from inlet conditions to the chosen reference conditions; ii) polymer formed by the reaction at the chosen reference conditions; and iii) polymer and unreacted feed from the chosen reference conditions to the reaction conditions. Enthalpy is a distinct property given the temperature, pressure, and composition of the various streams. Various enthalpies are calculated by standard thermodynamic equations and equations of state. Examples of equations of state include Benedict-Webb-Rubin, Peng-Robinson, and Redlich-Kwong. Companies that provide software to perform these calculations include Aspentech/Hyprotech (Houston, Tex.), PROSIM (France), and Chemstations (Houston, Tex.). Calculations are performed under the assumption that the inlet and outlet cycle gas flow rates are equal. In operation, about 5 percent of the cycle gas is consumed during a reactor pass. All values used in the calculations are conditioned appropriately to remove noise to maximize the accuracy of the calculations.

Using an enthalpy balance, the production rate can be calculated using the following equation, which takes into account that the functions used to calculate the heat of reaction and the reactor heat loss calculate positive numbers:

$$F_{resin} = \frac{Q_L + F_{Rxin}*H_{Rxino} - F_{vap}*H_{vap} - F_{liq}*H_{liq}}{\Delta H_{rxn}}$$

where:
$F_{resin}$=resin production, kg/hr
$Q_L$=heat loss to atmosphere, kcal/hr
$F_{Rxin}$=reactor inlet flow, kg/hr
$H_{Rxino}$=reference enthalpy of reactor inlet flow, kcal/kg
$F_{vap}$=vapor flow to reactor, kg/hr
$H_{vap}$=enthalpy of vapor feed to reactor, kcal/kg
$F_{liq}$=liquid flow to reactor, kg/hr
$H_{liq}$=enthalpy of liquid feed to reactor, kcal/kg
$\Delta H_{rxn}$=heat of reaction, kcal/kg Using the above equation and a set of chosen reference conditions, the maximum production rate is calculated at the reference conditions without regard to production rate limitations due to the cooling agent. Next, the maximum production rate using the chosen reference conditions is calculated with the cooling agent concentration limiting the heat transfer from the reactor. Using an iterative algorithm method, the difference between the maximum production rates is minimized along with the amount of the induced cooling agent required. Examples of iterative algorithms include the bisection and Newton methods. Software packages are also available to solve the equations including Mathcad by Mathsoft (Cambridge, Mass.) and Maple by Maplesoft (Waterloo, Ontario, Canada).

Another method to calculate the overall maximum production rate uses limiting constraints. The limiting constraint is the minimum value of the active constraints. The maximum overall production rate is determined by the following equation:

$PR_{limit}=\min(PR_{max,1}, PR_{max,2}, PR_{max,3}, \ldots, PR_{max,n-1}, PR_{max,n})$ where:

$PR_{limit}$=Overall maximum production rate
$PR_{max,1}$=Maximum Production Rate Due to Constraint 1
$PR_{max,2}$=Maximum Production Rate Due to Constraint 2
$PR_{max,3}$=Maximum Production Rate Due to Constraint 3
.
.
.
$PR_{max,n}$=Maximum Production Rate Due to Constraint n Production rate is affected by a variety of production parameter constraints. Examples of constraints are listed as follows, but it is only a representative list, not an exhaustive list: cooling water supply temperature; reactor feed monomer flow rate; cooling water flow rate; dew point temperature/condensation level; monomer feed valve position; catalyst feed rate; external equipment constraints; and product discharge rate. The effect the constraints have on the production rate are expressed in the calculations below and used to determine the overall maximum production rate by the minimum active constraint value. Exemplary constraint calculations are shown below.

The production rate is impacted by the cycle gas cooler operation. The maximum production rate as limited by the cooling water system temperatures is calculated. The minimum water temperature at the cooler inlet at minimum cooling water $\Delta T_{min}$ is determined using the following equation:

$$T_{1min} = T_{CWS} + \Delta T_{min}$$

where:
$T_{1min}$=Cooler inlet water temperature at $\Delta T_{min}$
$\Delta T_{min}$=Minimum allowed temperature difference between cooling water inlet and cooling water supply
$T_{CWS}$=Cooling water supply temperature The ratio of the difference between the bed temperature and cooler water inlet temperature at $\Delta T_{min}$ to that of the bed temperature and the current cooler water inlet temperature is calculated by the following expression.

$$\beta = \frac{T_{Bed} - T_{1min}}{T_{Bed} - T_1}$$

where:
$\beta$=Ratio of maximum conditions to current conditions
$T_{Bed}$=Reactor bed temperature
$T_1$=Current cooler water inlet temperature The production rate as impacted by the cycle gas cooler operation can now be calculated:

$$PR_{max} = \beta \cdot PR$$

where:
$PR_{max}$=Maximum production rate
PR=Current production rate

The maximum production rate as impacted by the present and the maximum monomer flow rates can also be calculated:

$$PR_{max} = \frac{Cm_{mf} - Flow_{mf}}{Flow_{mf}} \cdot PR + PR$$

where:
$PR_{max}$=Maximum production rate
PR=Current production rate
$Cm_{mf}$=Maximum monomer molar flow rate
$Flow_{mf}$=Reactor molar feed flow rate of component i The present and the maximum desired cooling water valve positions can be used to calculate the effect on the maximum production rate:

$$PR_{max} = PR \cdot \frac{VOPEN - VCLOSE}{VALPOS + VOPEN - VP - VCLOSE}$$

where:
$PR_{max}$=Maximum production rate
PR=Current production rate
VALPOS=Current water valve position
VP=Desired maximum for valve position
VCLOSE=Valve position when fully closed
VOPEN=Valve position when fully open The maximum production rate can also be impacted by either the desired temperature difference from the inlet dew point temperature, or the extent of condensation at the reactor inlet. The maximum production rate based on temperature difference from dew point, which is applicable when the reactor is not in condensing mode, is determined by:

$$PR_{max} = PR \cdot \frac{T_1 - T_{dew} - T_{off}}{T_1 - T_2}$$

where:
$PR_{max}$=Maximum production rate
PR=Current production rate
$T_1$=Temperature of cycle gas cooler gas inlet
$T_2$=Temperature of cycle gas cooler gas outlet
$T_{dew}$=Cycle gas dew point temperature
$T_{off}$=Desired difference between reactor inlet and the dew point temperatures The maximum production rate as affected by the weight percent condensed cooling agent, applicable when the reactor is in condensing mode, is determined by:

$$PR_{max} = PR \cdot \frac{H_{bed} - H_{incspec}}{H_{bed} - H_{in}}$$

where:
$PR_{max}$=Maximum production rate
PR=Current production rate
$H_{bed}$=Enthalpy at reactor bed conditions
$H_{incspec}$=Enthalpy at reactor inlet at desired weight percent condensed
$H_{in}$=Enthalpy at current reactor inlet conditions The various enthalpies are calculated by standard thermodynamic equations and equations of state software. Examples of the companies that provide software to perform these calculations include Aspentech/Hyprotech (Houston, Tex.), PROSIM (France), and Chemstations (Houston, Tex.).

The present and the desired maximum ethylene valve positions can also impact the maximum production rate:

$$PR_{max} = PR \cdot \frac{VOPEN - VCLOSE}{VALPOS + VOPEN - VP - VCLOSE}$$

where:
$PR_{max}$=Maximum production rate
PR=Current production rate
VALPOS=Current ethylene valve position VP=Desired maximum for valve position
VCLOSE=Valve position when fully closed
VOPEN=Valve position when fully open The calculation of the catalyst feed affect on the maximum production rate differs based on whether the feeder system used is slurry or dry. Because the maximum catalyst flow of a slurry feeder is directly available to the process computer, the calculation of the maximum production rate in this instance is simple:

$$PR_{max} = Catfl_{max} \cdot Catprod$$

where:
$PR_{max}$=Maximum production rate
$Catfl_{max}$=Maximum catalyst flow
Catprod=Catalyst productivity When dry catalyst is used, it is necessary to first determine the maximum catalyst flow rate through each feeder in the system and then add the two rates:

$$Catfl_{max} = \frac{Maxspd_A}{Curspd_A} \cdot Catfl_A + \frac{Maxspd_B}{Curspd_B} \cdot Catfl_B$$

where:
$Catfl_{max}$=Maximum catalyst flow
Maxspd=Maximum motor speed
Curspd=Current motor speed
A,B=Subscripts indicating Feeder A or B From this point, the maximum production rate is calculated by the same equation as that used for slurry catalyst, where all variables are identical to those used in the slurry catalyst equation:

$$PR_{max} = Catfl_{max} \cdot Catprod$$

The effect on the maximum production rate by the product discharge system throughput can be calculated as follows:

$$PR_{max} = M_{drop} \cdot Drops_{max}$$

where:
$PR_{max}$=Maximum production rate
$M_{drop}$=Mass of a drop
$Drops_{max}$=Maximum number of drops per hour Using the above calculations, the maximum achievable production rate is calculated at current operating conditions. Then the maximum production rate is calculated at the current operating conditions without regard to production rate limitations due to the cooling agent concentration. Next, the maximum production rate using the current operating conditions is calculated assuming only the cooling agent concentration limits production from the reactor. Once the two maximum production rates are calculated, the minimum induced cooling agent concentration is calculated which minimizes the difference between the two, using the iterative calculation algorithms described above.

Figure 1:
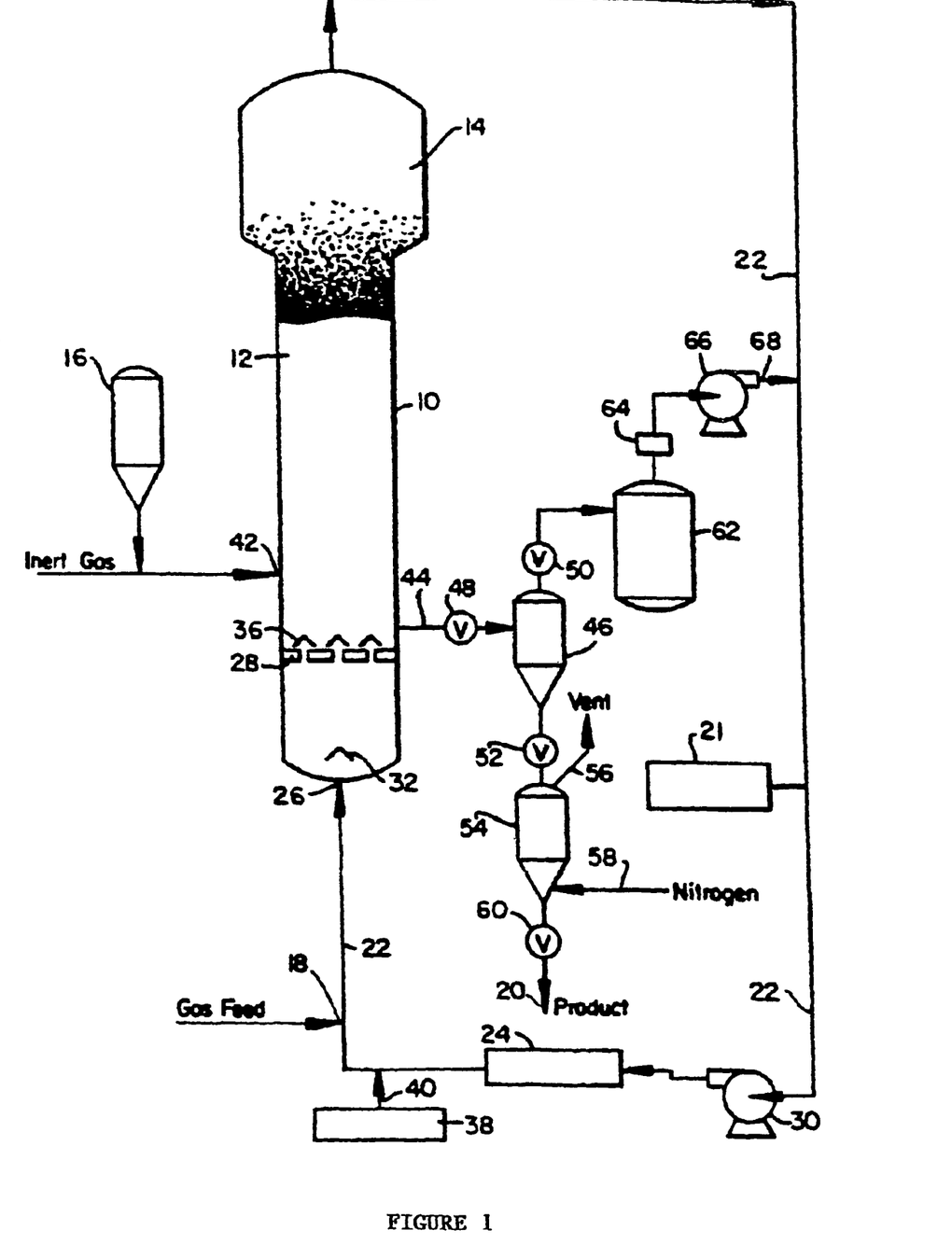
FIG. 1 is a schematic of a typical fluidized bed reactor for making polyolefins.

A fluidized bed reaction system which is particularly suited to production of polyolefin resin by the practice of the invention is illustrated in FIG. 1. With reference thereto, a reactor 10 consists of a reaction zone 12 and a velocity reduction zone 14. Details of about the process and associated equipment within the process are as described in U.S. Pat. No. 4,543,399 which is hereby incorporated by reference.

The reaction zone 12 includes a bed of growing polymer particles, formed polymer particles and a minor amount of catalyst particles fluidized by the continuous flow of polymerizable and modifying gaseous components in the form of make-up feed and recycle fluid through the reaction zone.

The partially or totally activated precursor composition and/or catalyst used in the fluidized bed is preferably stored for service in a reservoir 16 under a blanket of a gas which is inert to the stored material, such as nitrogen or argon.

Fluidization is achieved by a high rate of fluid recycle to and through the bed, typically in the order of about 50 times the rate of feed of make-up fluid. The fluidized bed has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor.

Make-up fluid is typically fed to the bed at point 18. Alternatively, make-up fluid may be introduced before a compressor 30, after the compressor 30 or after a heat exchanger 24. A gas analyzer 21 determines the composition of the recycle stream. The feed rate of the make-up components is adjusted accordingly to maintain a desired gaseous composition within the reaction zone. In an alternate embodiment, components of the make-up fluid are fed at different points along the recycle stream or into the reactor.

The gas analyzer is a conventional gas analyzer which indicates recycle stream composition and is commercially available from a wide variety of sources. Generally, the gas analyzer 21 can be positioned so as to receive gas from a point between the velocity reduction zone 14 and heat exchanger 24, preferably at the compressor 30 outlet.

To ensure complete fluidization, the recycle stream and, where desired, at least part of the make-up stream is returned through recycle line 22 to the reactor at point 26 below the bed. There may be preferably a gas distributor plate 28 above the point of return to aid in fluidizing the bed. In passing through the bed, the recycle stream absorbs the heat of reaction generated by the polymerization reaction.

The portion of the fluidizing stream which does not react in the bed constitutes the recycle stream which is removed from the polymerization zone, preferably by passing it into velocity reduction zone 14 above the bed where entrained particles are given an opportunity to drop back into the bed.

The recycle stream is then compressed in a compressor 30 and then passed through a heat exchange zone wherein the heat of reaction is removed before it is returned to the bed. The heat exchange zone is typically a heat exchanger 24 which can be of the horizontal or vertical type. The recycle stream is then returned to the reactor at its base 26 and to the fluidized bed through gas distributor plate 28. A gas deflector 32 may be installed at the inlet to the reactor to prevent contained polymer particles from settling out and agglomerating into a solid mass. A typical deflector is described in U.S. Pat. No. 4,933,149, which is hereby incorporated by reference.

The temperature of the fluidized bed in the reaction zone 12 in the preferred embodiment remains constant in a steady state by continuously removing the heat of reaction. A steady state of the reaction zone 12 occurs when the amount of heat generated in the process is balanced with the amount of heat removed. This steady state requires that the total quantity of material entering the polymerization process is balanced by the amount of polymer and other material removed. Consequently, the temperature, the pressure, and the composition at any given point in the process is constant with time. There is no significant temperature gradient within most of the fluidized bed in the reaction zone 12, however, there is a temperature gradient in the bottom of the fluidized bed in the reaction zone 12 in the region above the gas distributor plate 28.

Illustrative of the polymers which can be produced in accordance with the invention are the following: ethylene homopolymers and ethylene copolymers employing one or more $C_3$-$C_{12}$ alpha olefins; propylene homopolymers and propylene copolymers employing one or more $C_4$-$C_{12}$ alpha olefins; two reactor polymers, including impact polypropylene copolymers; polyisoprene; polystyrene; polybutadiene; polymers of butadiene copolymerized with styrene; polymers of butadiene copolymerized with acrylonitrile; polymers of isobutylene copolymerized with isoprene; ethylene propylene rubbers and ethylene propylene diene rubbers; polychloroprene, and the like.

Catalysts as are known in the art may be used, including, but not limited to, Ziegler-Natta, single site, and metallocene types, as disclosed in U.S. Pat. Nos. 4,393,182; 5,106,806; 5,455,366; 5,329,033; 5,145,819; 5,317,036; and 5,693,727 and PCT Application No. WO96/23010, which are incorporated herein by reference.

Any fluid inert to the catalyst and reactants can also be present in the recycle stream. An activator compound, if utilized, is preferably added to the reaction system downstream from heat exchanger 24. Thus, the activator may be fed into the recycle system from dispenser 38 through line 40.

The induced cooling agent(s) are preferably condensable fluid(s) which are inert to the catalyst, reactants and the polymer product produced; or the monomers and comonomers used in the polymerization. The condensable fluid can be introduced into the reaction/recycle system at any point in the system. In a preferred embodiment, the condensable fluid is an induced condensing agent (ICA). Condensable fluids include saturated or unsaturated hydrocarbons. Examples of suitable condensable fluids may be selected from liquid saturated hydrocarbons containing 3 to 7 carbon atoms (e.g., propane, n-butane, isobutane, n-pentane, isopentane, neopentane, n-hexane, isohexane, and other saturated $C_6$ hydrocarbons, n-heptane, and other saturated $C_7$ hydrocarbons, and mixtures thereof); and polymerizable condensable comonomers (e.g., olefins, alpha-olefins, diolefins, diolefins containing at least one alpha olefin, such as propylene, 1-butene, isobutene, hexene, hexadiene, isoprene, styrene, octadiene, ethylidene norbornene, butadiene and mixtures thereof) may be used. If polymerizable condensable comonomers are employed, they may be partially or entirely incorporated into the polymer product.

The fluid-bed reactor should be operated at a temperature below the sintering temperature of the polymer particles to ensure that sintering will not occur. The sintering temperature is a function of resin density. In general, polyethylene low-density resins, for example, have a low sintering temperature and polyethylene high-density resins, for example, have a higher sintering temperature. For example, temperatures of from about 75° C. to about 95° C. are used to prepare ethylene copolymers having a density of from about 0.91 g/cm³ to about 0.95 g/cm³, while temperatures of from about 100° C. to about 115° C. are used to prepare ethylene copolymers or homopolymers having a density of from about 0.95 g/cm³ to about 0.97 g/cm³.

The fluid-bed reactor may be operated at pressures of up to about 1000 psi, and for polyolefin resin production preferably operated at a pressure of from about 100 psi to about 600 psi, preferably from about 250 psi to about 550 psi, with operation at the higher pressures in such ranges favoring heat transfer since an increase in pressure increases the unit volume heat capacity of the gas.

The partially or totally activated precursor composition and/or catalyst (hereinafter collectively referred to as catalyst) is injected into the bed at a rate equal to its consumption at a point 42 which is above distributor plate 28. Preferably, the catalyst is injected at a point in the bed where good mixing of polymer particles occurs. Injecting the catalyst at a point above the distribution plate is an important feature for satisfactory operation of a fluidized bed polymerization reactor. Since catalysts are highly active, injection of the catalyst into the area below the distributor plate may cause polymerization to begin there and eventually cause plugging of the distributor plate. Injection into the fluidized bed, instead, aids in distributing the catalyst throughout the bed and tends to preclude the formation of localized spots of high catalyst concentration which may result in the formation of "hot spots." Injection of the catalyst into the reactor above the bed may result in excessive catalyst carryover into the recycle line where polymerization may begin and plugging of the line and heat exchanger may eventually occur.

The catalyst can be injected into the reactor by various techniques. It is preferred, however, to continuously feed the catalyst into the reactor utilizing a catalyst feeder as disclosed; e.g., in U.S. Pat. No. 3,779,712 which is hereby incorporated by reference. The catalyst is preferably fed into the reactor at a point 20 to 40 percent of the reactor diameter away from the reactor wall and at a height of about 5 to about 30 percent of the height of the bed.

A gas which is inert to the catalyst, such as nitrogen or argon, is preferably used to carry the catalyst into the bed.

Reaction rate affects the heat generated in the reactor which influences the production rate. Complete instrumentation of both the fluidized bed and the recycle stream cooling system is, of course, useful to detect any temperature change in the bed so as to enable either the operator or a conventional automatic control system to make a suitable adjustment in the temperature of the recycle stream.

Under a given set of operating conditions, the fluidized bed is maintained at essentially a constant height by withdrawing a portion of the bed as product at the rate of formation of the particulate polymer product. Since the rate of heat generation is directly related to the rate of product formation, a measurement of the temperature rise of the fluid across the reactor (the difference between inlet fluid temperature and exit fluid temperature) is indicative of the rate of particulate polymer formation at a constant fluid velocity if no vaporizable liquid is present in the inlet fluid.

On discharge of particulate polymer product from reactor 10, it is desirable and preferable to separate fluid from the product and to return the fluid to the recycle line 22. There are numerous ways known to the art to accomplish this. One preferred system is shown in the drawings. Thus, fluid and product leave reactor 10 at point 44 and enter product discharge tank 46 through valve 48 which is designed to have minimum restriction to flow when opened such as a ball valve. Positioned above and below product discharge tank 46 are conventional valves 50, 52 with the latter being adapted to provide passage of product into product surge tank 54. Product surge tank 54 has venting means illustrated by line 56 and gas entry means illustrated by line 58. Also positioned at the base of product surge tank 54, is a discharge valve 60 which when in the open position discharges product for conveying to storage. Valve 50 when in the open position releases fluid to surge tank 62. Fluid from surge tank 62 is directed through a filter absorber 64 and thence through a compressor 66 and into recycle line 22 through line 68. Product discharge systems are more fully described in U.S. Pat. Nos. 4,621,952; 6,255,411; 6,472,483; and 6,498,220 all of which are hereby incorporated by reference.

In a typical mode of operation, valve 48 is open and valves 50, 52 are in a closed position. Product and fluid enter product discharge tank 46. Valve 48 closes and the product is allowed to settle in product discharge tank 46. Valve 50 is then opened permitting fluid to flow from product discharge tank 46 to surge tank 62 from which it is continually compressed back into recycle line 22. Valve 50 is then closed and valve 52 is opened and any product in product discharge tank 46 flows into product surge tank 54. Valve 52 is then closed. The product is purged with inert gas, preferably nitrogen, which enters product surge tank 54 through line 58 and is vented through line 56. Product is then discharged from product surge tank 54 through valve 60 and conveyed through line 20 to storage.

The particular timing sequence of the valves is accomplished by the use of conventional programmable controllers which are well known in the art. Moreover, the valves can be kept substantially free of agglomerated particles by installation of provisions for directing a stream of gas periodically through the valves and back to the reactor.

The temperature of the fluidized bed is set dependent on the desired resin properties as well as on the particle sticking point but is basically dependent on three factors: (1) the catalyst activity and rate of catalyst injection which controls the rate of polymerization and the attendant rate of heat generation, (2) the temperature, pressure and composition of recycle and makeup streams introduced into the reactor and (3) the volume of the recycle stream passing through the fluidized bed. The amount of liquid introduced into the bed either with the recycle stream or by separate introduction as described previously especially affects the temperature because the liquid vaporizes in the reactor and serves to reduce the temperature of the fluidized bed.

As the concentration of condensable component is increased in the gaseous stream flowing through the bed, an identifiable point may be reached beyond which there is danger of failure of the process if the concentration is further increased. This point is characterized by an irreversible decrease in the fluidized bulk density with an increase in condensable fluid concentration in the gas. The liquid content of the recycle stream entering the reactor may not be directly relevant. The decrease in fluidized bulk density generally occurs with no corresponding change in the settled bulk density of the final product granules. Thus, the change in fluidization behavior reflected by the decrease in fluidized bulk density apparently does not involve any permanent change in the characteristics of the polymer particles.

The gas condensable fluid concentrations at which decreases in fluidized bulk density occur depend upon the type of polymer being produced and other process conditions. They may be identified by monitoring the fluidized bulk density as condensable fluid concentrations in the gas are increased for a given type of polymer and other process conditions.

Using such fluidized bulk density variations, stable operating conditions can be defined. Once a suitable composition has been identified, the composition may be used to achieve much higher cooling capacities for the recycle stream (without encountering bed instabilities) by cooling that composition to a greater degree. Condensable, non-polymerizable materials may be added in appropriate amounts for a particular grade to achieve high reactor productivity whilst preserving good conditions in the fluidized bed by staying within the so determined stable operating zone. High reactor productivity can be achieved in a process or, in terms of plant design, a large capacity plant can be designed with a relatively small reactor volume or existing reactors can be modified to provide increased capacity without changing the reactor size.

At higher reactor productivities it has been found that, staying within the boundaries defined by the acceptable fluidized bulk density changes, levels of condensed liquid well over about 15%, about 20%, about 22%, about 25% or even about 30% can be accommodated whilst avoiding significant levels of chunking or sheeting resulting from fluidized bed disruption. The levels of condensed liquid based on the total weight of the recycle stream or fluidizing medium is in the range of between about 0 to about 50 weight percent, preferably greater than about 3 to about 50 weight percent and even more preferably about 5 to about 30 weight percent, and most preferably about 8 to about 20 weight percent. For condensing mode operation, please refer to U.S. Pat. Nos. 5,834,571; 5,352,749; and 4,588,790 which are incorporated by reference in their entirety.

For given composition and physical characteristics of the product particles in the fluidized bed and otherwise given or related reactor and recycle conditions, and by defining boundary conditions related to the composition of the gas flowing through the bed, a viable fluidized bed can be maintained at high cooling levels as described in U.S. Pat. No. 5,352,749, which is hereby incorporated by reference.

Once stable operation has been reached, the process is optimized using the methods described above. Optimization is defined herein as maintaining a desired production rate at a given set of operating conditions with a minimal amount of induced cooling agent being employed.

The optimization is performed by a set of calculations. Process information is collected via a control system. The collected information can then be used in the following calculations to determine a new optimal target for the percentage of induced cooling agent. The new target is then sent to control systems which maintain the induced cooling agent concentration in the reaction cycle gas. These calculations minimize the amount of induced cooling agent to a desired production rate. An example of these calculations using the following reactor operating limits and initial conditions follows:

Cooling limited production rate=28,000 lb/hr
Non-cooling limited production rate=26,000 lb/hr
Low isopentane limit=0.00%
High isopentane limit=15.00%
Inlet temperature=49.7° C.
Bed temperature=85.0° C.
Pressure=310.4 psig
Weight % condensing=5.7%
Cycle gas composition=31.00 mol % ethylene
  2.40 mol % ethane
  5.30 mol % isopentane
  3.40 mol % hexene
  4.53 mol % hydrogen
  53.37 mol % nitrogen Enthalpy is a distinct property given temperature, pressure, and composition and can be calculated using a number of different equations of state and thermodynamic software packages including those described above. For this example, the Benedict/Webb/Rubin equation of state was used for all enthalpy calculations. The reactor outlet conditions can be approximated by using the bed conditions. The current cycle gas mass enthalpy at reactor outlet conditions can be calculated as defined in the following equations using the above conditions (step 1):

$$H_{bed} = H^{\circ}_{vap} / \text{wtmol}_g$$

where:
$H_{bed}$ is the mass enthalpy of the cycle gas at reactor outlet conditions
$H^{\circ}_{vap}$ is the vapor molar enthalpy of the cycle gas at reactor outlet conditions
$\text{wtmol}_g$ is the average molecular weight of the cycle gas $H_{bed}$=4938.3 (btu/lbmol)/31.3 (lb/lbmol)
$H_{bed}$=157.7 (btu/lb)

The total inlet mass enthalpy of the cycle gas at reactor inlet conditions can then be calculated from the following equations using the inlet conditions (step 2):

1. $HC_{vap}=H^i_{vap}/wtmol_g$
2. $HC_{liq}=H_{liq}/wtmol_l$
3. $H_{v1}=Wt_{cnd}*HC_{liq}+(1-Wt_{cnd})*HC_{vap}$ where:

$HC_{vap}$ is the vapor mass enthalpy of the cycle gas at reactor inlet conditions $H^i_{vap}$ is the vapor molar enthalpy of the cycle gas at reactor inlet conditions $wtmol_g$ is the average molecular weight of the cycle gas $HC_{liq}$ is the liquid mass enthalpy of the cycle gas at reactor inlet conditions $H_{liq}$ is the liquid molar enthalpy of the cycle gas at reactor inlet conditions $wtmol_l$ is the average molecular weight of the liquid $H_{v1}$ is the total inlet mass enthalpy $Wt_{cnd}$ is the weight fraction condensing $HC_{vap}$=4114.5 (btu/lbmol)/30.2 (lb/lbmol)
$HC_{vap}$=136.24 (btu/lb)
$HC_{liq}$=−1897.4 (btu/lbmol)/72.2 (lb/lbmol)
$HC_{liq}$=−26.28 (btu/lb)
$H_{v1}$=0.057*{−26.28 (btu/lb)}+(1−0.057)*136.24 (btu/lb)
$H_{v1}$=126.93 (btu/lb)

The change in cycle gas mass enthalpy across the bed can then be calculated using the following relationship (step 3):

$$H=H_{bed}-H_{v1}$$

where:

H is the change in cycle gas mass enthalpy across the bed $H_{bed}$ is the mass enthalpy of the cycle gas at reactor outlet conditions $H_{v1}$ is the total inlet mass enthalpy of the cycle gas H=157.7 (btu/lb)−126.93 (btu/lb)
H=30.77 (btu/lb)

The target cycle gas mass enthalpy change across the bed can then be calculated as follows:

$$H_{target}=H*PR_{nlc}/PR_{lc}$$

where:

$H_{target}$ is the target cycle gas mass enthalpy change across the bed

H is the change in cycle gas mass enthalpy across the bed $PR_{nlc}$ is the production rate limit not limited by cooling $PR_{lc}$ is the production rate limit that is limited by cooling $H_{target}$=30.77 (btu/lb)*26,000 (lb/hr)/28,000 (lb/hr)
$H_{target}$=28.57 (btu/lb)

By using an iterative technique, the current mass enthalpy of the cycle gas at reactor outlet conditions (step 1), the total inlet mass enthalpy of the cycle gas (step 2), and the change in the mass enthalpy across the bed (step 3) are calculated while changing the isopentane (induced cooling agent) concentration, and solving for the isopentane concentration that will produce a mass enthalpy change across the bed that is equal to the target mass enthalpy change across the bed, the optimal isopentane concentration is calculated as 3.72 mol %. Note that many different techniques can be used to calculate the isopentane concentration that will produce a mass enthalpy change across the bed that is equal to the target cycle gas mass enthalpy change across the bed. For example, making small incremental changes to the isopentane concentration and solving steps 1-3 until the desired target cycle gas mass enthalpy change across the bed is achieved. Illustrated below is a bisection method starting with the low and high isopentane range limits.

The starting point for the bisection calculation is the midpoint of the range (high limit+low limit)/2. In this case we have given the high limit as 15.00 mol % and the low limit as 0.00 mol %, so the starting point is 7.50 mol % isopentane. Calculating through steps 1-3 using the 7.5 mol % isopentane gives a cycle gas enthalpy change across the bed of 34.96 (btu/lb). This value is higher than the target cycle gas enthalpy change across the bed of 28.57 (btu/lb) from step 4. Therefore the next isopentane concentration to use will be the previous isopentane concentration as the new high limit plus the low limit divided by 2, or 3.75 mol %. If this value is too high then we would next try the previous value of 3.75% plus the low limit of 0.00 mol % divided by 2, or 1.875 mol %. If the value was too low then we would use the 3.75 mol % as the new low limit and the last value that was too high as the high limit, for example if 3.75 mol % was too low and we already calculated 7.50 mol % as too high so we would use (7.50%+3.75%)/2, or 5.625 mol %. We then repeat this bisection process until the calculated isopentane concentration is within an error band of 0.01 mol %. In this example the optimal isopentane is 3.72 mol %.

The following examples further illustrate the calculations performed to optimize the amount of induced cooling agent used.

Example 1

A gas phase polyethylene process is operated at a temperature of 87° C. and pressure of 20.7 bar with the following gas composition:

| | |
|---|---|
| Isopentane | 5.3 mol % |
| Ethylene | 31 mol % |
| Ethane | 2.4 mol % |
| n-Hexene | 3.4 mol % |
| Hydrogen | 4.5 mol % |
| Nitrogen | 53.4 mol % |

The reactor inlet temperature is 50° C. and the inlet pressure is 21.4 bar. The process is operating at a production rate of 26,000 kg/hr. External constraints exist limiting the reactor to the current production rate. However, the above gas composition is capable of producing 28,000 kg/hr based on available reactor cooling. There is an excess of isopentane (induced cooling agent) in the recycle gas. The amount of isopentane in the gas composition that provides the cooling required to produce 26,000 kg/hr cooling is 4.1 mol %. Therefore, the gas composition is adjusted to reduce the amount of isopentane in the gas composition to 4.1 mol %.

Example 2

A gas phase polyethylene process is operated at a temperature of 85° C. and pressure of 20.7 bar with the following gas composition:

| | |
|---|---|
| Isopentane | 1.2 mol % |
| Ethylene | 33 mol % |
| Ethane | 1 mol % |
| n-Hexene | 4.8 mol % |

-continued

| Hydrogen | 4.7 mol % |
|---|---|
| Nitrogen | 55.3 mol % |

The reactor inlet temperature is 33° C. and the inlet pressure is 21.4 bar. The process is operating at a production rate of 36,000 kg/hr. The reactor is cooling limited, therefore the production rate is limited to 36,000 kg/hr. However, if there were no cooling limitation, the reactor could reach a production rate of 38,000 kg/hr based on non-cooling reactor constraints. The amount of isopentane (induced cooling agent) in the gas composition that provides the increased cooling required to produce 38,000 kg/hr cooling is 2.3 mol %. Therefore, the gas composition is adjusted to increase the amount of isopentane in the gas composition to 2.3 mol %, which subsequently increases the production rate by 2,000 kg/hr.

As demonstrated above, embodiments of the invention provide a method for optimizing the amount of induced cooling agent in a gas phase polymerization process. Advantages of this simplified process may include all or some of the following: a reduction in the amount of induced cooling agent required; improvement in the stability of the reactor operation; a reduction in environmental impact; and increased production rates.

While the invention has been described with respect to a limited number of embodiments, the specific features of one embodiment should not be attributed to other embodiments of the invention. No single embodiment is representative of all aspects of the invention. In some embodiments, the process may include numerous steps not mentioned herein. In other embodiments, the process does not include, or are substantially free of, any steps not enumerated herein. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. A process for controlling a continuous gas phase exothermic process in a reactor comprising:
   (i) effecting a gas phase exothermic reaction under a set of operating conditions in the presence of a cooling agent, the cooling agent having a concentration and a feed rate of an induced cooling agent;
   (ii) determining a maximum production rate (I) without regard to limitations due to the cooling agent under the operating conditions;
   (iii) determining a maximum production rate (II) with regard to limitations due to the cooling agent under the operating conditions;
   (iv) calculating an optimal concentration of the induced cooling agent such that the difference between (I) and (II) is minimized; and
   (v) adjusting the feed rate of the induced cooling agent to achieve the concentration value calculated in (iv)
   wherein the cooling agent comprises reactants, inerts and the induced cooling agent.

2. The process of claim 1, wherein the continuous gas phase exothermic process is an ethylene polymerization process or a propylene polymerization process.

3. The process of claim 1, wherein the reactor is a fluidized bed reactor and comprises a reactor bed, a reactor outlet and a reactor inlet and the calculation of the optimal concentration of the induced cooling agent comprises:
   (i) calculating a cycle gas mass enthalpy at the reactor outlet conditions;
   (ii) calculating a total cycle gas inlet mass enthalpy at the reactor inlet conditions;
   (iii) calculating a change in the cycle gas mass enthalpy across the reactor bed;
   (iv) calculating a target cycle gas mass enthalpy change across the bed; and
   (v) iteratively calculating the concentration of the induced cooling agent that produces a cycle gas mass enthalpy change across the bed substantially equal to the target cycle gas mass enthalpy change across the bed.

4. The process of claim 1, wherein the operating conditions comprise an inlet temperature, a bed temperature, a reactor pressure, a cycle gas composition, and a weight percentage condensing of the reactor inlet stream.

5. The process of claim 1, wherein the production rate is calculated from the following equation:

$$F_{resin} = \frac{Q_L + F_{Rxin} * H_{Rxino} - F_{vap} * H_{vap} - F_{liq} * H_{liq}}{\Delta H_{rxn}}$$

wherein $F_{resin}$ is resin production, $Q_L$ is heat loss to atmosphere, $F_{Rxin}$ is reactor inlet flow, $H_{Rxino}$ is reference enthalpy of reactor inlet flow, $F_{vap}$ is vapor flow to reactor, $H_{vap}$ is enthalpy of vapor feed to reactor, $F_{liq}$ is liquid flow to reactor, $H_{liq}$ is enthalpy of liquid feed to reactor, and $\Delta H_{rxn}$ is heat of reaction.

6. The process of claim 3, wherein the cycle gas mass enthalpy of the reactor at outlet conditions is calculated by the following equation:

$$H_{bed} = H°_{vap}/wtmol_g$$

wherein, $H_{bed}$ is the cycle gas mass enthalpy at reactor outlet conditions, $H°_{vap}$ is the vapor molar enthalpy of the cycle gas at the reactor outlet conditions, and $wtmol_g$ is the average molecular weight of the gas.

7. The process of claim 3, wherein the total cycle gas mass enthalpy at the reactor inlet is calculated by the following equations:

$$HC_{vap} = H^i_{vap}/wtmol_g \qquad a.$$

$$HC_{liq} = H_{liq}/wtmol_l \qquad b.$$

$$H_{v1} = Wt_{cnd} * HC_{liq} + (1-Wt_{cnd}) * HC_{vap} \qquad c.$$

wherein $HC_{vap}$ is the vapor cycle gas mass enthalpy at reactor inlet conditions, $H^i_{vap}$ is the vapor molar enthalpy of the cycle gas at reactor inlet conditions, $wtmol_g$ is the average molecular weight of the cycle gas, $HC_{liq}$ is the liquid mass enthalpy of the cycle gas at reactor inlet conditions, $H_{liq}$ is the liquid molar enthalpy of the cycle gas at reactor inlet conditions, $wtmol_l$ is the average molecular weight of the liquid, $H_{v1}$ is the total inlet mass enthalpy, and $Wt_{cnd}$ is the weight fraction of the condensed cycle gas at the reactor inlet.

8. The process of claim 3, wherein the change in the cycle gas mass enthalpy across the reactor bed is calculated by the following equation:

$$H = H_{bed} - H_{v1}$$

wherein, H is the change in the cycle gas mass enthalpy across the bed, $H_{bed}$ is the cycle gas mass enthalpy at reactor outlet conditions, and $H_{v1}$ is the total cycle gas mass enthalpy at reactor inlet conditions.

9. The process of claim 3, wherein the target cycle gas mass enthalpy change across the bed is calculated by the following equation:

$$H_{target} = H * PR_{nlc}/PR_{lc}$$

wherein $H_{target}$ is the target cycle gas mass enthalpy change across the bed, H is the change in cycle gas mass enthalpy change across the bed, $PR_{nlc}$ is the production rate not limited by the cooling agent concentration, and $PR_{lc}$ is the production rate that is limited by the cooling agent concentration.

10. The process of claim 1, wherein the induced cooling agent is a liquid saturated hydrocarbon containing 3 to 7 carbon atoms or polymerizable condensable comonomers.

11. The process of claim 1, wherein the induced cooling agent is isopentane.

12. The process of claim 1, wherein the induced cooling agent is hexane.

13. The process of claim 3, wherein the iterative calculation of the concentration is achieved by a bisection method, a Newton method, a secant method, or a regula falsi method.

14. The process of claim 1, wherein the induced cooling agent is a gas inert to the process.

15. The process of claim 1, wherein the induced cooling agent is an induced condensing agent.

16. The process of claim 15, wherein the induced condensing agent is a saturated hydrocarbon containing 3 to 7 carbon atoms.

17. The process of claim 16, wherein the induced condensing agent is isopentane.

18. The process of claim 16, wherein the induced condensing agent is hexane.

19. The process of claim 2, wherein ethylene and at least one alpha-olefin are polymerized.

20. The process of claim 2, wherein ethylene is polymerized.

21. The process of claim 19, wherein the alpha-olefin comprises one or more $C_3$-$C_{12}$ alpha-olefins.

22. The process of claim 1, wherein the induced cooling agent is non-condensable.

23. The process of claim 1, wherein the reactants, the inerts, and the induced cooling agent are all condensing.

24. The process of claim 1, wherein the reactants, the inerts, and the induced cooling agent all are not condensing.

25. The process of claim 1, wherein the reactants are condensing but the inerts and the induced cooling agent are not condensing.

26. The process of claim 1, wherein the reactants and the inerts are condensing and the induced cooling agents are not condensing.

27. The process of claim 1, wherein the reactants and the induced cooling agent are not condensing and the inerts are condensing.

28. The process of claim 1, wherein the reactants and the induced cooling agent are condensing and the inerts are not condensing.

29. The process of claim 1, wherein the inerts and the induced cooling agent are condensing and the reactants are not condensing.

30. The process of claim 1, wherein the induced cooling agent is condensing but the reactants and the inerts are not condensing.

* * * * *